2 Sheets—Sheet 1.
W. DAVY.
SCRAPER.
No. 11,516. Reissued Dec. 3, 1895.
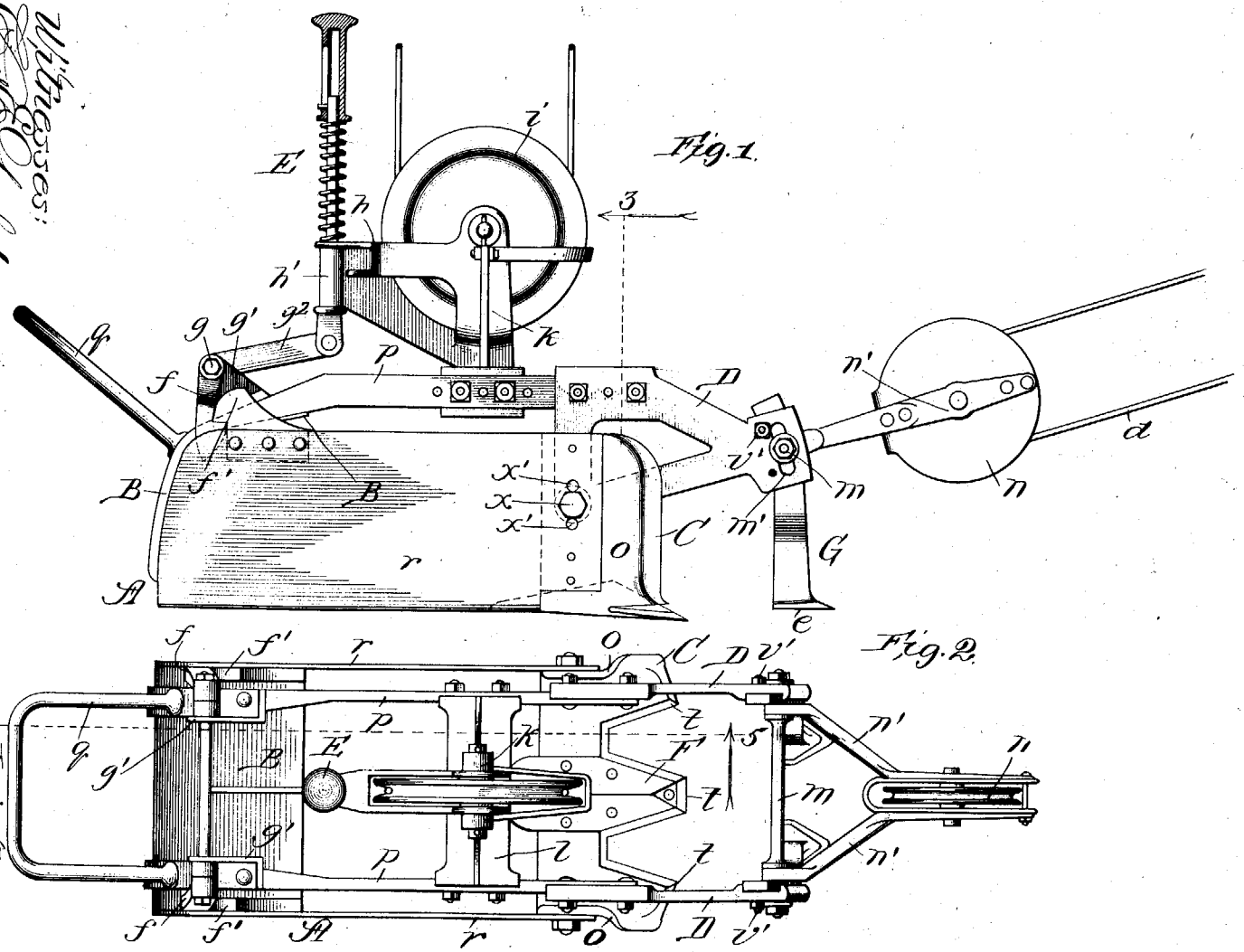
Witnesses:
Chas. E. Gaylord.
Luther J. Alter.
Inventor:
William Davy
By Dyrenforth & Dyrenforth,
Attys.

W. DAVY.

SCRAPER.

No. 11,516. Reissued Dec. 3, 1895.

Witnesses:
Chas. E. Gaylord.
Lute. J. Fitter.

Inventor:
William Davy,
By Dyrenforth & Dyrenforth.
Att'ys.

UNITED STATES PATENT OFFICE.

WILLIAM DAVY, OF KENOSHA, WISCONSIN.

SCRAPER.

SPECIFICATION forming part of Reissued Letters Patent No. 11,516, dated December 3, 1895.

Original No. 514,645, dated February 13, 1894. Application for reissue filed October 1, 1895. Serial No. 564,344.

*To all whom it may concern:*

Be it known that I, WILLIAM DAVY, a citizen of the United States, residing at Kenosha, in the county of Kenosha and State of Wisconsin, have invented a new and useful Improvement in Scrapers, of which the following is a specification.

My invention relates to an improvement in the class of so-called "scrapers," the same being in the nature of scoops or buckets adapted to cut and become filled with soil by dragging them upon it in a manner to cause them to penetrate the same, and which are further adapted to be hoisted and carried by machinery between the points of filling and dumping and to be dumped of their contents by backward tilting.

My object is to provide a scraper which shall be especially serviceable for sewer-excavations and which shall afford a material improvement in the class referred to in the way of details of construction and combinations of parts, whereby, among other advantages, the device shall be adapted to cut readily through very hard as well as the softer soil, to break up the soil in filling, thus to adapt it to discharge the more readily, and to be dumped automatically.

Figure 3:
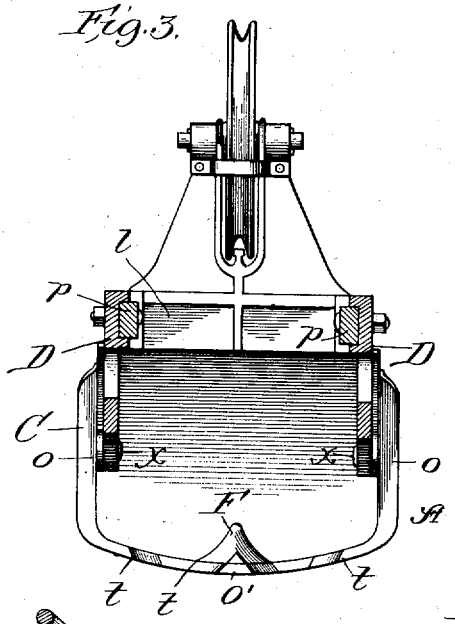
Figure 4:
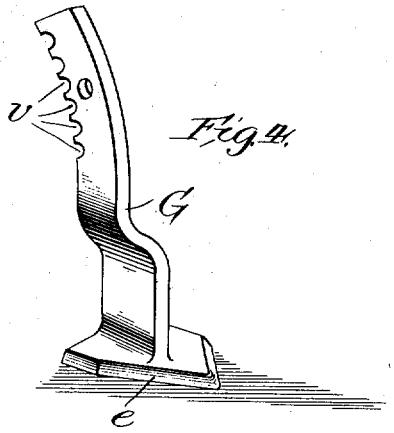
Figure 5:
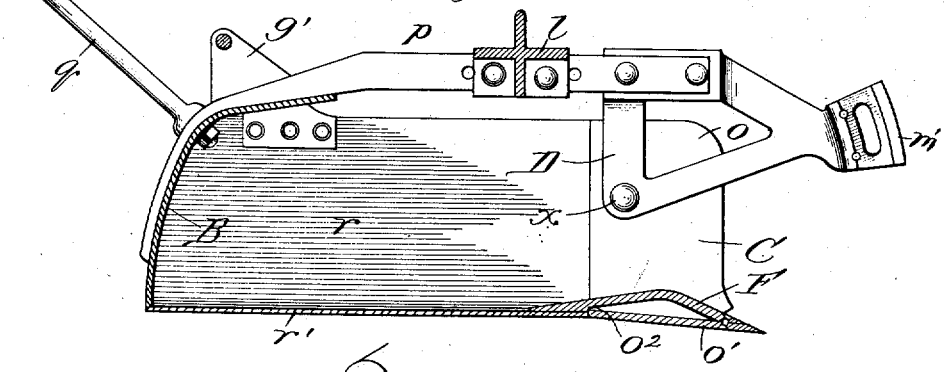
Figure 6:
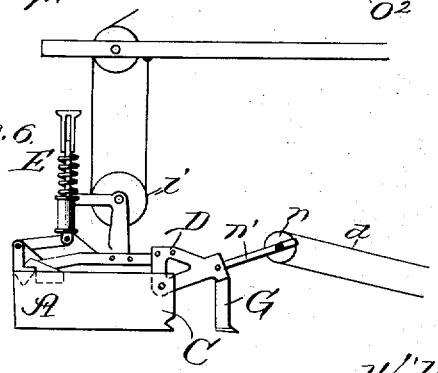

In the accompanying drawings, Figure 1 shows my improved scraper in side elevation. Fig. 2 is a plan view of the same. Fig. 3 is a section taken at the line 3 on Fig. 1 and viewed in the direction of the arrow. Fig. 4 is a perspective view of a colter detail. Fig. 5 is a sectional view taken partly at each of the lines 5 on Fig. 2 and viewed in the direction of the arrow. Fig. 6 is a view in the nature of a diagram to illustrate the relation of the trip mechanism of the scraper when about to be dumped to the boom.

A is the body of the scraper, comprising, preferably, a single piece of sheet-steel bent to form sides $r$ and a bottom $r'$ and open at its forward and rear ends.

B is the back for the body portion, having fastened to it the rearward-extending guiding-handle $q$, and which is in turn fastened rigidly to the side bars $p$ $p$ of the supporting-frame, which bars extend above the sides $r$ of the body A beyond the forward end thereof. C is the plow or cutter comprising a steel plate bent to conform to the cross-section of the body A, inside of which it fits, being fastened at its side portions $o$ to the sides $r$ of the body near its forward end, where said sides extend forward beyond the bottom $r'$, so that the rear edge of the base $o'$ of the plow shall abut against the forward edge of the bottom $r'$, being also thicker than the latter, the adjustment being such as to render the junction flush on the lower surfaces of the parts $r'$ and $o'$ and afford an offset $o^2$ across the rear upper edge of the latter. It will be noticed that the base $o'$ inclines downward and forward somewhat to give to the plow a tendency to penetrate the soil at its forward edge, where it is provided with teeth $t$, sharpened on their edges, and the side pieces $o$ of the plow are also sharpened by outward beveling from their inner surfaces along their forward edges, toward which they are caused to flare somewhat to extend laterally beyond the width of the body portion A to cut somewhat wider than that width and thus induce a tendency the better to crowd the plowed soil into the scraper.

D D are brackets, of generally triangular shape, pivotally fastened at one of their angles, as at $x$, to the opposite sides $r$ and $o$ of the body portion and plow, and to the upper rear angles of the brackets are fastened the forward ends of the sides $p$, the latter and the angle-brackets thus forming the frame on which the plow-carrying body portion is pivotally supported at $x$ near its forward end. I make the pivotal connection $x$ adjustable to adapt the pivots to be set in any one of a series of vertical holes $x'$, thereby to lower or raise the connection at will, according to desire, in regulating the extent of penetration by the draft of the plow-teeth into the soil. The draft is applied to a pulley $n$, journaled in bearings $n'$, extending forward from a shaft $m$, with which they are pivotally connected at their rear ends, the shaft being adjustably fastened at its opposite ends in segmental slots $m'$, provided in the forward portions of the angular brackets D, and affording a medium for the regulation of the draft.

Between the frame sides $p$, near the transverse center of the body A, is a cross-bar $l$, from which extends upward a bearing $k$, having journaled in it the suspension-pulley $i$, and the bearing $k$ carries a rearward-extending arm $h$, terminating in a vertical guide-socket $h'$, in which is confined a vertical spring-controlled plunger E. This plunger is pivotally connected from its lower end, through the medium of a crank-arm $g^2$, with a rock-shaft $g$, journaled in bearings $g'$, which project backward from the sides $p$ of the frame, the rock-shaft carrying near its opposite ends dogs $f$ to engage catches $f'$, rigidly fastened in proper position to the inner surfaces of the sides $r$.

F is a species of dividing-shoe approximately V-shaped in cross-section, as shown in Fig. 3, and of somewhat similar shape in longitudinal section, as shown in Fig. 5, being preferably hollow and provided with a flat base, at which it fits against the offset $o^2$, being fastened to the upper surfaces of the bottom $r'$ and plow-base $o'$ to extend across the junction between the two lengthwise of the center of the body portion A nearly to the forward end of the central plow-teeth $t$. On the shaft $m$, near its opposite ends, are fastened colters G, each being bent transversely of its shank portion sufficiently inward to bring its cutting-foot portion $e$ in line with the space between the central plow-teeth $t$ and the tooth flanking it. As means for rigidly holding the colters in the various positions of adjustment of the shaft $m$, I provide a series of recesses $v$ in the rear edges of the shanks of the colters to admit rigid stops $v'$ in proper position on the brackets D.

The operation of the device is as follows: It is suspended in the usual or any suitable manner to adapt it to be raised and lowered on the boom of a hoisting-machine (see Fig. 6) at its suspension-pulley $i$, and from the pulley $n$ it is connected, through the medium of the cable $d$, chain, or the like, with the winding mechanism of the machine in any suitable or well-known manner. Thus the scraper is adapted, as usual, to be lowered to the soil to be scooped and dragged along the same to loosen and fill itself therewith and thereupon be hoisted and carried to the point of dumping. In thus dragging the scraper the advance cutting of the soil is performed by the colters, and the plow C thereafter finishes the loosening, while the dragging of the scraper causes it to fill with the loosened soil, which is considerably broken up or divided by the alternate engagement of the colters and plow-teeth. In the scraper, however, the central divider F still further breaks up the soil as it fills into the same, wherein it is in such a thoroughly broken-up condition that its discharge from the scraper is greatly facilitated. When the scraper has been filled, it is hoisted and caused to travel by the dragging mechanism to the point at which it is desired to discharge the contents. There the scraper is raised till the plunger E strikes the boom, and the consequent depression of the plunger withdraws the dogs $f$ from the catches $f'$, thereby releasing the body portion to enable it to tilt backward on its pivotal support $x$, free from the back B, and dump the contents. Thereafter when the scraper is again lowered into its filling position by resting at the bottom $r'$ on the ground the dogs $f$ will automatically re-engage the catches $f'$ and lock the body portion A to the supporting-frame.

What I claim as new, and desire to secure by Letters Patent, is—

1. In a scraper, the combination with the body, of a plow C at the forward end thereof and having the downwardly inclining bottom and the outwardly flaring cutting sides, substantially as described.

2. In a scraper, the combination with the body, of a plow C at the forward edge thereof and having the downwardly inclining bottom provided with teeth and the outwardly flaring cutting sides, substantially as described.

3. In a scraper, the combination with the body A having its sides extended beyond the forward end of its base, of a plow C at the forward end thereof conforming to the cross-section of the body and fitting and fastened between said side-extensions and abutting at its base against said forward end of the base of the body, the base of the plow inclining downward and forward and having teeth at the sides thereof flaring outward on their inner surfaces and affording cutting edges, substantially as described.

4. In a scraper, the combination of the body-portion A having, at its forward end, a plow C adapted to cut along its forward vertical edges and provided with teeth $t$ on its base, colters G supported in advance of the plow to alternate with said teeth, and a central dividing shoe F on the bottom of the scraper, substantially as and for the purpose set forth.

5. In a scraper, the combination of the body-portion A having, at its forward end, a plow C formed with upright sharpened sides $o$, flaring outwardly toward their cutting edges, and a base $o'$ having teeth $t$, colters G supported in advance of the plow to alternate with said teeth, and a central dividing shoe F on the bottom of the scraper, substantially as and for the purpose set forth.

6. In a scraper, the combination of the body-portion A, a frame having side-bars $p$ carrying the back B and to which said body-portion is pivoted near its forward end, means by which to suspend the scraper to said frame, and automatic dumping-means comprising pivotal dog and catch mechanism and a spring-plunger E connected with the dog and adapted to be actuated, all substantially as and for the purpose set forth.

7. In a scraper, the combination of the body-portion A having side-catches $f'$, and a plow C at its forward end, a frame comprising the side-bars $p$, carrying the back B, and the angle-brackets D on which said body-portion is pivotally supported near its forward end, colters G adjustably supported on said brackets and a drag-pulley *n* connected therewith, a suspension-pulley *i* in a bearing *k* extending from the sides *p* and provided with a socket-bearing extension *h*, a spring-plunger E in said socket-bearing, and pivotal dogs *f* connected with the spring-plunger, the whole being constructed and arranged to operate substantially as described.

WILLIAM DAVY.

In presence of—
J. N. HANSON,
J. H. LEE.